Nov. 15, 1966   C. L. SIGMON   3,284,987
SEALING DEVICE
Filed March 18, 1963   4 Sheets-Sheet 1
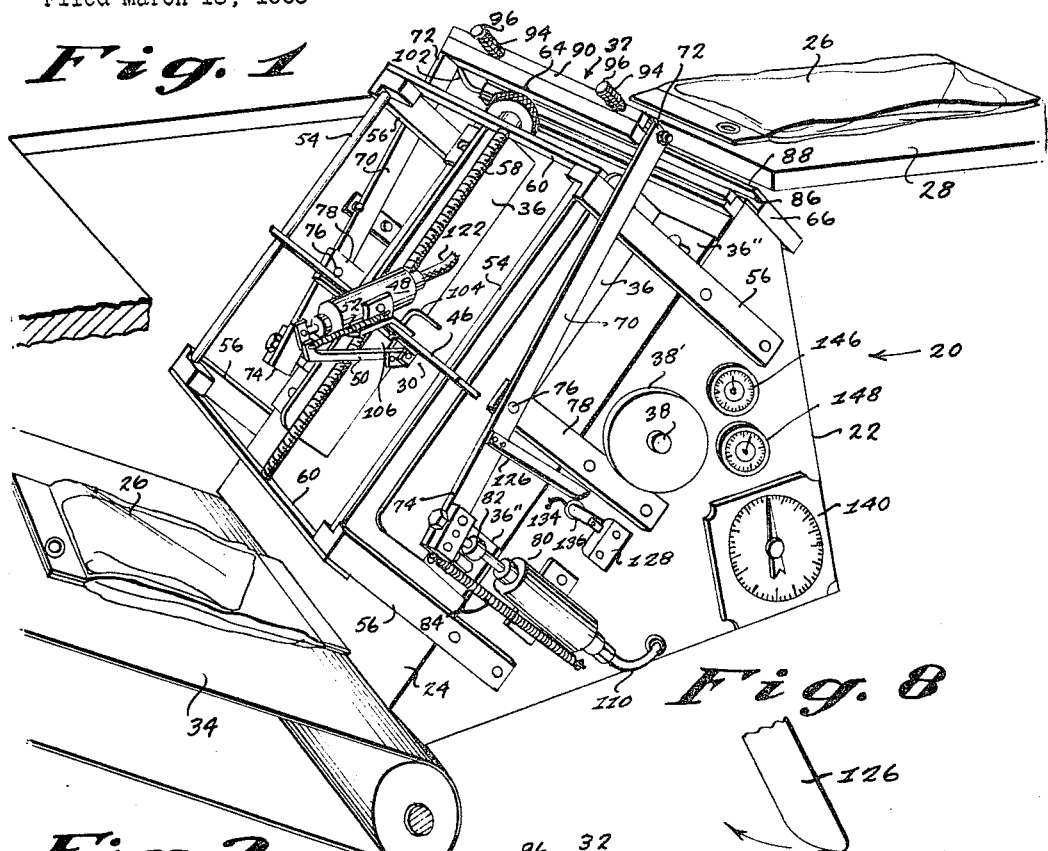
INVENTOR.
CARL L. SIGMON
BY
Channing L. Richards &
Dalbert U. Shefte
ATTORNEYS Nov. 15, 1966  C. L. SIGMON  3,284,987
SEALING DEVICE Filed March 18, 1963  4 Sheets-Sheet 2

INVENTOR.
CARL L. SIGMON
BY
Channing L. Richards
& Delbert U. Shefte
ATTORNEYS

Nov. 15, 1966    C. L. SIGMON    3,284,987
SEALING DEVICE
Filed March 18, 1963    4 Sheets-Sheet 3
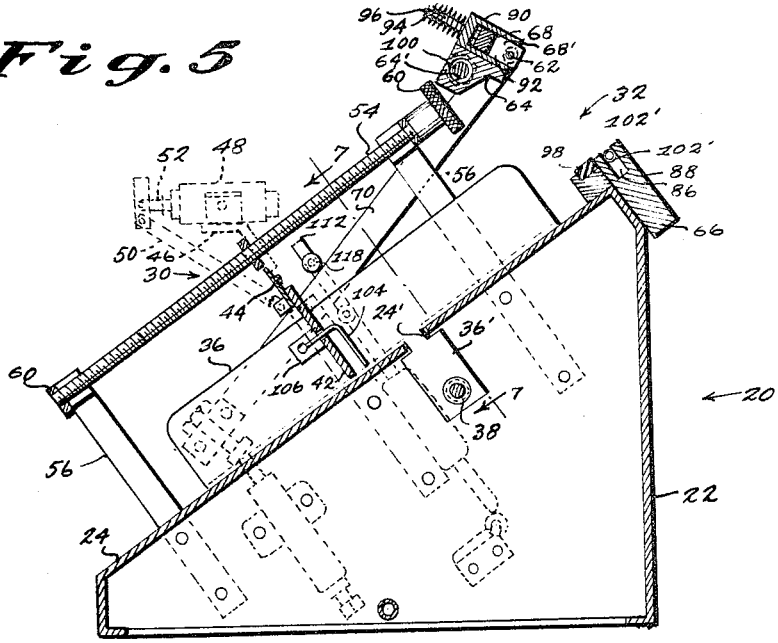
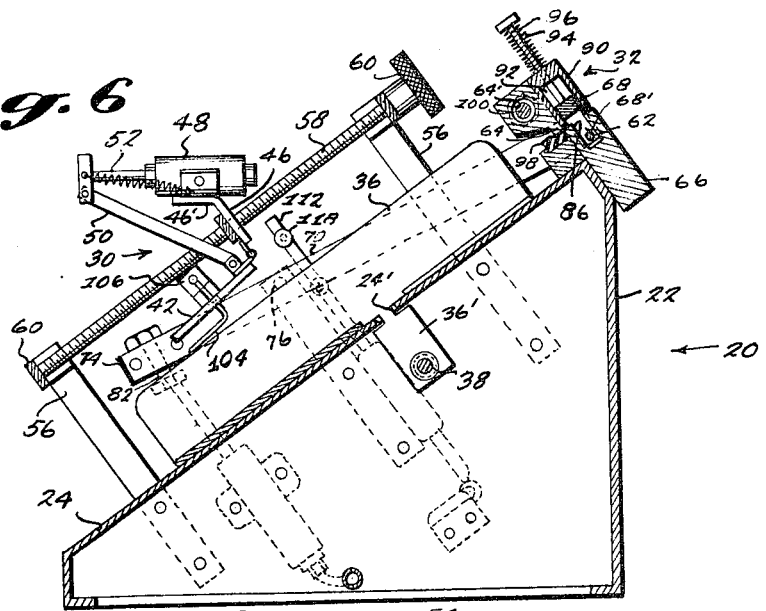
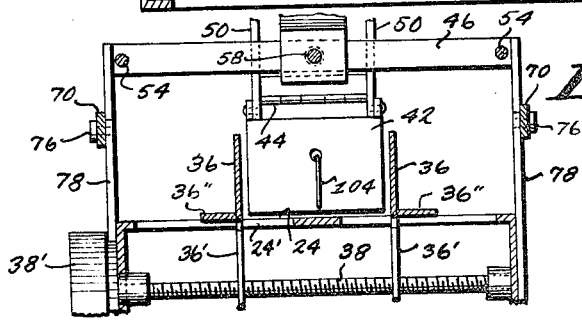
INVENTOR.
CARL L. SIGMON
BY
Channing L. Richards &
Dalbert U. Shefte
ATTORNEYS

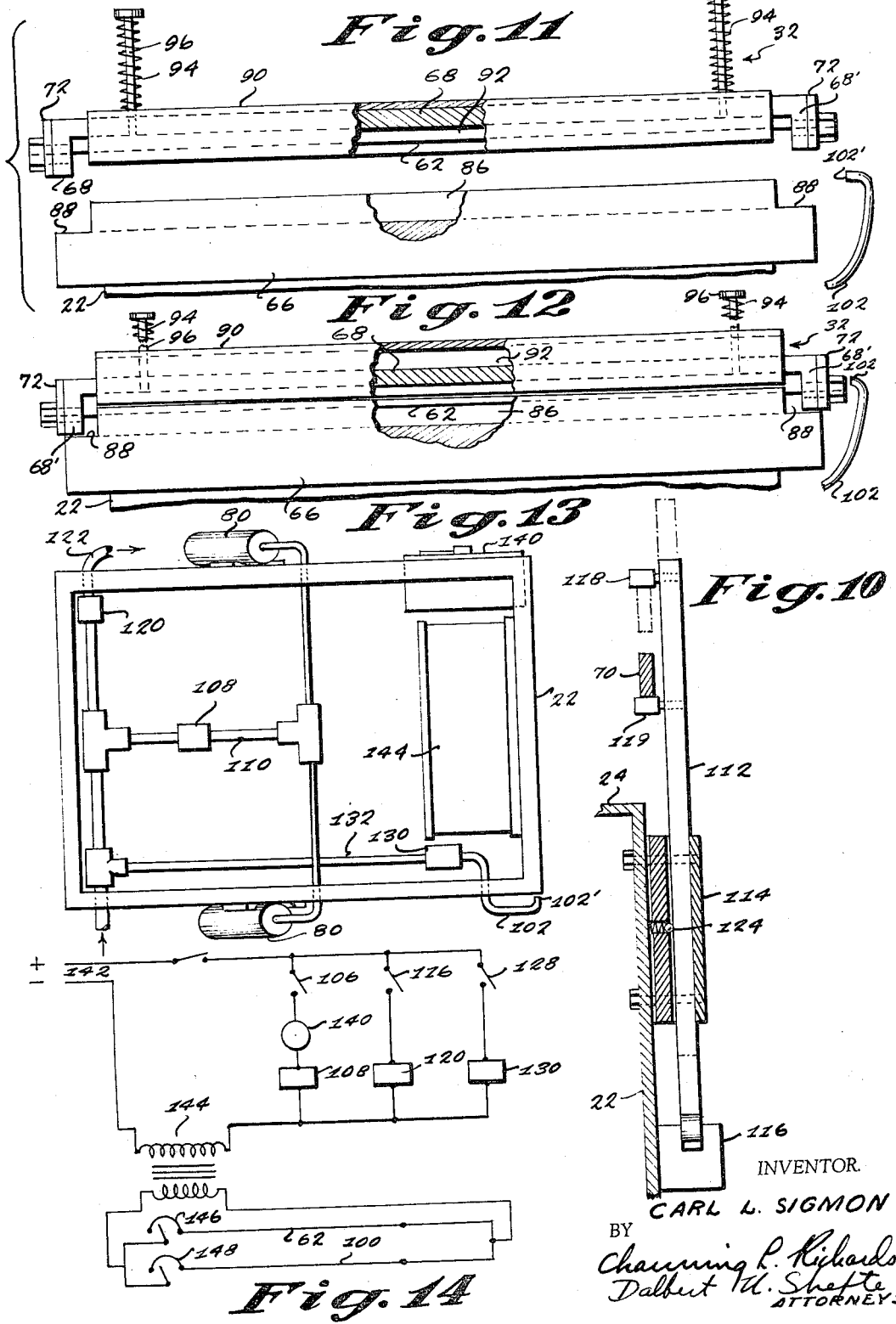

United States Patent Office 3,284,987
Patented Nov. 15, 1966

3,284,987
SEALING DEVICE
Carl L. Sigmon, Hickory, N.C., assignor, by mesne assignments, to Hickory Foundry and Machine Company, Hickory, N.C., a corporation of North Carolina
Filed Mar. 18, 1963, Ser. No. 265,726
10 Claims. (Cl. 53—373)

The present invention relates to a sealing device for heat sealing superimposed sheets of thermoplastic material in an expeditious, efficient and reliable manner readily adaptable to automatic operation, and is particularly applicable to automatic bag sealing machines to provide a machine wherein the cofunctioning of the machine components is integrally controlled automatically by responsive interrelation of the components such that they are mutually responsive one to another for direct and positive actuation of the components in proper timed relation to provide expedient operation without lost time between the various manipulations.

The present invention may be incorporated to advantage in a bag sealing machine having an inclined slideway on which bags are positioned by gate means for sealing by automatic heat sealing means acting transversely of the slideway. These gate and sealing components are responsively interrelated such that when a bag is detected at the gate means the sealing means is automatically actuated to move to sealing position, which in turn actuates opening of the gate means to release the sealed bag for discharge along the slideway in prompt timed relation to the sealing operation. As the gate means opens, it actuates the sealing means to move to inoperative position, which in turn promptly actuates closing of the gate means in readiness for positioning of another bag. Thus, upon initial actuation of the machine in response to detection of a bag in position for sealing, a complete sealing discharging cycle of operation is automatically performed rapidly and efficiently through the mutually responsive arrangement of the machine components.

Advantageously, the present invention provides for the detection of a bag in sealing position and the responsive automatic initiation of an operating cycle by a bag sensing component mounted on the gate means to actuate the sealing manipulation of the sealing means when a bag is detected thereby in sealing position at the gate means. This bag sensing component is movable with the gate means out of the path of the bags and functions additionally to actuate manipulation of the sealing means to inoperative position when the bag sensing component is moved out of bag contact by opening of the gate means. Thus, the bag sensing component serves a dual purpose, simplifying the construction and operating, and provides control of the sealing means manipulation in expeditious timed relation to the progress of a bag through the machine without unnecessary time delay.

Machines embodying the present invention and designed for sealing the ends of bags containing pairs of socks are capable of operating continuously at high speeds heretofore not possible, being limited by the speed of the operator in feeding bags to the machine rather than by the machine itself. Thus, the machine is capable of operating at speeds substantially greater than the rate at which an experienced operator can fill empty bags with a pair of socks and feed the filled bags to the machine, which is in excess of 30 cycles per minute. In comparison, prior machines are inherently limited to speeds such as 12 to 15 cycles per minute, substantially below the feeding rate of an experienced operator. The high production rate of machines embodying the present invention is even more significant where bags are fed automatically at speeds greater than possible by manual feeding.

In the preferred embodiment of the present invention, the sealing operation is performed by a heated wire or rod element that passes through the end of the bag or other thermoplastic sheets into a recess in a sealing bed to seal and also trim the end of the bag. Associated for movement with this sealing and trimming element is a clamping member having a recess in which the sealing element is positioned, with the clamping member acting to hold the bag against the sealing bed as the sealing element moves from the clamping member recess, through the bag and into the sealing bed recess. The waste material resulting from the trimming action of the sealing and trimming element is removed by pneumatic means, such as a jet of air directed at the sealing bed. This pneumatic means is efficiently and simply controlled in response to manipulation of the sealing element, being actuated by initial movement of the sealing element away from the sealing bed and being deactuated by approach of the sealing element to its inoperative position. Thus, the removal of waste is accomplished simply and directly without increasing the operating time of the machine or requiring additional independent control means.

As the aforesaid sealing and trimming element must pass completely through the end of the bag or sheets to trim the end properly, sealing contact occurs only at the edge of the trimmed end and is of short duration, resulting in a relatively narrow seal. The duration of sealing contact is further reduced when the sealing device is operated at the high speeds contemplated by the present invention, at which speeds the sealing contact is almost instantaneous. This seal is enhanced in the present invention by an additional sealing element acting in combination with the sealing and trimming element to seal the bags or sheets inwardly of the trimmed ends.

This additional sealing element is arranged for movement with the sealing and trimming element to act simultaneously therewith so as not to require any increase in the operating time of the machine. In the preferred embodiment, this additional sealing element is fixed to the aforementioned clamping member for movement therewith to act against the sealing bed, and remains in sealing contact during the period that the clamping member remains against the sealing bed as the sealing and trimming element moves into the sealing bed recess to trim and seal the end of the bag or sheets. Thus, the additional sealing element of the present invention operates simply and effectively to enhance the sealing of the bag or sheets without requiring additional operating mechanism other than the element itself and means for heating the element, and without increasing the overall operating time of the sealing device.

This additional sealing feature of the present invention is applicable to manually or automatically actuated sealing devices of various types for providing a reliable seal for superimposed sheets of thermoplastic material as well as to the automatic bag sealing machine of the embodiment of the present invention described in detail hereinbelow.

Other and further features and advantages of the present invention will be apparent from the following description and accompanying drawings, in which:

FIG. 1 is a perspective view of an automatic bag sealing machine incorporating the preferred embodiment of the present invention;

FIG. 2 is a plan view of the automatic bag sealing machine of FIG. 1;

FIG. 5 is a vertical sectional view taken along line 5—5 of FIG. 2;

FIG. 6 is a vertical sectional view taken along line 6—6 of FIG. 2, and showing the gate member in open position;

FIG. 7 is a vertical sectional view taken along line 7—7 of FIG. 5 of the gate member and adjacent elements;

FIG. 8 is an enlarged elevational view of the air jet actuating switch of the machine of FIG. 1, showing a non-actuating position of the elements;

FIG. 9 is a view similar to FIG. 8, showing the switch elements in an actuating position;

FIG. 10 is a vertical sectional view of the gate actuating switch elements of the machine of FIG. 1 taken along line 10—10 of FIG. 4;

FIG. 11 is an end elevational view, partially in section, of the sealing means of the machine of FIG. 1, showing the elements in an intermediate open position;

FIG. 12 is a view similar to FIG. 11, showing the elements in sealing position;

FIG. 13 is a bottom view of the machine of FIG. 1, showing the pneumatic system; and FIG. 14 is a diagrammatic wiring diagram of the electrical system of the machine of FIG. 1.

Figure 3:
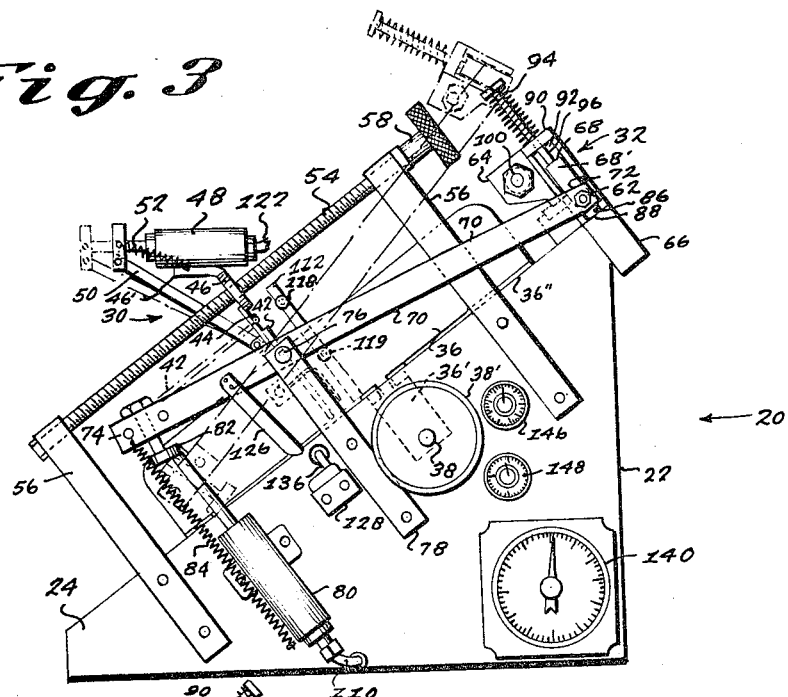
FIG. 3 is a right side elevational view of the machine of FIG. 1.
Figure 4:
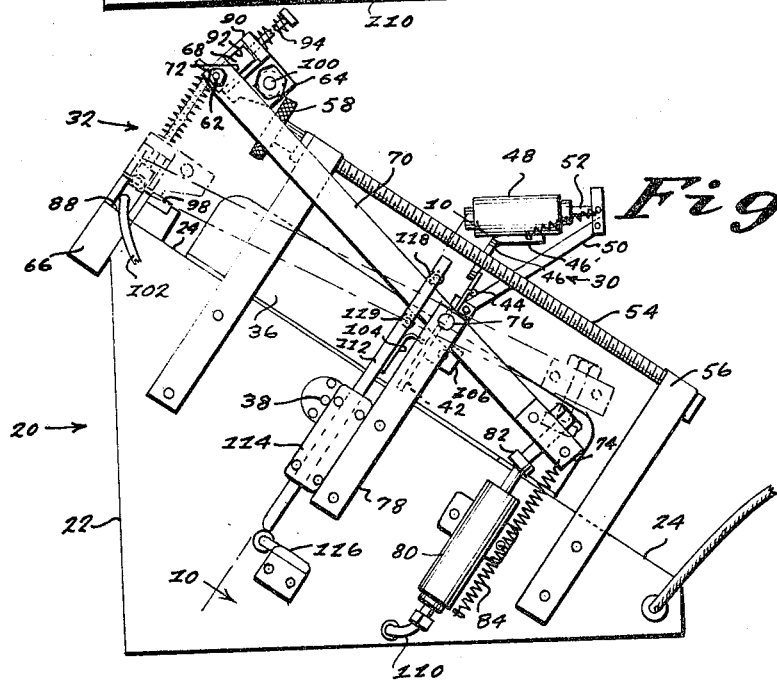
FIG. 4 is a left side elevational view of the machine of FIG. 1.

The drawings illustrate the preferred embodiment of the present invention incorporated in an automatic bag sealing machine 20 having bag positioning and sealing components mounted on a housing 22 that contains the pneumatic and electrical systems that automatically control manipulation of these operating components.

The top of the housing 22 is inclined downwardly to form a bag supporting slideway 24 on which bags 26 slide as they advance through the machine. The bags 26 are fed onto the upper end of the slideway 24 from a filling table 28 at which articles, such as pairs of socks, are inserted into the bags through open ends, with the open ends being at the rear of the bags as fed to the machine. As the bags progress through the machine, they are initially positioned by gate means 30 for sealing of the open ends by sealing means 32 at the upper end of the slideway, and are subsequently released by opening of the gate means 30 for sliding along the slideway to discharge from the lower end thereof onto conveyor means 34 that carry the filled and sealed bags to a subsequent processing station, where they may, for example, be packaged for shipment.

The bags 26 are guided in proper lateral position along the slideway 24 by a pair of upstanding, longitudinally extending, spaced guide plates 36 having depending flanges 36' extending through transverse slots 24' in the slideway, with the flanges oppositely threaded on a common screw shaft 38 that can be manually rotated by the control knob 38' to adjust the spacing between the guide plates 36 to accommodate different bag widths. The guide plates 36 are maintained upright and in parallelism by laterally extending, slotted flanges 36" positioned by pins 40 extending from the slideway 24 into the flange slots.

The gate means 30, that positions the bags on the slideway 24 for sealing, includes a gate member 42 extending transversely across the slideway between the guide plates 36 for stopping filled bags with their open ends at the sealing means 32, and is hinged, as at 44, along its upper edge to a transversely extending bracket 46 for pivoting upwardly to an open position away from the slideway (FIG. 6) to permit sealed bags to progress down the slideway for discharge from the machine. The gate member is pivoted to open position by a pneumatic cylinder-piston mechanism 48 mounted on a horizontal flange 46' of the transverse bracket 46, with linkage 50 connecting the piston and gate member, so that when the cylinder-piston mechanism is actuated to extend the piston, the gate member 42 will be pivoted to open position. A pair of return springs 52 extending between the cylinder and the piston return the piston to its initial position when the piston-cylinder mechanism 48 is deactuated, thereby actuating the gate member to closed position.

The aforementioned transverse bracket 46, to which the gate member 42 is hinged, is slidably mounted at its ends to a pair of longitudinally extending parallel guide rods 54 mounted on upstanding posts 56 secured to the housing 22. The position of the bracket 46 on the guide rods 54 is adjusted to vary the spacing of the associated gate member 42 from the sealing means 32, by an adjusting screw 58 extending longitudinally between cross-pieces 60 connected to the posts 56 and threadably engaging the bracket 46 so that rotation of the adjusting screw 58 will cause the bracket to move up or down the slideway 24. By this means, the position of the gate member can be adjusted to position bags of different lengths with their open ends properly located for sealing at the sealing means 32.

The sealing means component of the illustrated embodiment is composed of a sealing and trimming rod 62 and an additional sealing bar 64, both of which extend transversely of the slideway 24 and act against a sealing bed 66 mounted transversely across the housing 22 at the top of the slideway 24, on which bed the open ends of bags are positioned for sealing by the gate member 42. This sealing bed preferably extends above the surface of the slideway 24 so that the seal is formed generally in the center of the thickness of the filled bag, rather than at the bottom surface thereof.

The sealing and trimming rod 62 has electrical resistance characteristics such that it can be heated by an electrical current to a temperature sufficient to plasticize the thermoplastic bag material for trimming and sealing thereof, and is mounted across an inverted U-shaped frame 68 with the ends of the rod secured in, but electrically insulated from, the depending ends 68' of the frame at a spacing from the frame base.

The frame 68 and rod 62 are pivoted between a sealing and trimming position (FIGS. 3, 6 and 12) at the sealing bed 66 and a raised, inoperative position (FIGS. 1, 4, 5 and 11) by a pair of spaced rocker arms 70 having upper ends 72 secured to the depending ends 68' of the frame 68, and being rocked about intermediate pivots 76 on pivot posts 78 extending from the housing 22 by piston-cylinder mechanisms 80 mounted on the housing and acting on adjustable fingers 82 at the lower ends 74 of the rocker arms 70. The piston-cylinders are simultaneously actuated to extend the pistons, which raise the lower ends 74 of the rocker arms 70 and thereby pivot the upper ends 72 and attached sealing and trimming rod 62 to sealing position. Deactuation of the piston-cylinder mechanisms 80 allows the rocker arms 70 to pivot the sealing and trimming rod 62 to its raised, inoperative position under the bias of return spring 84 connected between the cylinders and the lower ends 74 of the rocker arms.

The aforementioned sealing bed 66 is formed with a recess 86 aligned with the sealing and trimming rod 62 for receipt of the rod therein as it passes through bags to trim and seal the ends thereof, and has relieved ends 88 generally aligned with the bottom of the recess and arranged to serve as stops for the rod supporting ends 68' of the frame 68 to limit the sealing position of the sealing and trimming rod 62 within the recess 86.

Bags 26 are held against the sealing bed 66 during sealing and trimming movement of the rod 62 into the sealing bed recess 86 by a clamping member 90 carried by the rod support frame 68 inwardly of the depending ends 68' thereof. This clamping member 90 has a recess 92 aligned with the sealing bed recess 86 and in which the base of the rod supporting frame 68 is positioned for carrying the clamping member. The clamping member 90 is yieldably held in straddling disposition on the frame by compression springs 94 mounted outwardly of the clamping member on rods 96 secured to the frame 68 and extending through the clamping member 90. The recess 92 in the clamping member is deep enough to position the sealing and trimming rod 62 therein until the clamping member engages the sealing bed 66 to clamp a bag end therebetween, with the clamping member remaining in this clamping position under the biasing of the springs 94 as the sealing and trimming rod 62 moves from the clamping member recess 92 into the sealing bed recess 86 to seal and trim the bag end and returns to the clamping member recess on the return stroke.

The clamping member 90 has fixed thereto the previously mentioned additional sealing bar 64 for movement of the bar with the clamping member into bag clamping position against the sealing bed 66, which has a resilient pad 98 inserted therein in alignment with the bottom surface of the bar 64 and extending slightly above the surface of the bed to assure continuous sealing contact of the bag end by the bar. As the bar 64 is fixed to the clamping member 90 it remains in bag sealing and clamping contact during the time that the sealing and trimming rod 62 moves between the clamping member recess 92 and the sealing bed recess 86, with this dwell period allowing the bar to effect a reliable sealing of the bag inwardly of the trimmed end.

The additional sealing bar 64 is heated to a bag sealing temperature by an electrical resistance element 100 mounted in a bore 64' extending through the length of the bar.

As a result of the trimming action of the sealing and trimming rod 62, there is usually some trimmed waste material left at the sealing bed, which it is desirable to remove before a succeeding bag is positioned for sealing. In the illustrated embodiment, this waste material is removed by pneumatic means in the form of an air jet blown along the sealing bed recess 86 from a conduit 102 having its discharge end 102' directed toward an end of the sealing bed recess at a spacing therefrom sufficient to avoid interference with the manipulation of the various sealing means elements. This air jet is actuated during the movement of the sealing and trimming rod 62 and associated elements to their raised position after a sealing operation has been completed.

The above described sealing and trimming element 62 and the heating element 100 of the additional sealing bar 64 are electrically connected in the electrical circuit illustrated diagrammatically in FIG. 14, which circuit also includes the actuating switches and solenoid, air valves that control manipulation of the machine components as described in detail below. In this electrical circuit, an electrical power source 142 is connected to the input side of a transformer 144 to the output side of which the sealing and trimming element 62 and heating element 100 are connected in parallel. A rheostat 146 is connected in line with the sealing and trimming element 62 and is settable to vary the current and therefore the temperature of the sealing and heating element for most effective sealing and trimming operation. Similarly, a rheostat 148 is connected in line with the heating element 100 of the additional sealing bar 64 for adjustably controlling the temperature for proper sealing of a bag by the bar.

The various operating components of the presently described bag sealing machine are automatically manipulated in proper timed relation for responsive interrelation of the components effected by: a sealing means actuating component associated with the gate means for detecting the presence of a bag at the gate member to actuate operation of the sealing means for sealing, and subsequently responsive to opening of the gate member to actuate movement of the sealing means to raised, inoperative position; gate actuating means responsive to manipulation of the sealing means to actuate opening and closing of the gate member; and air jet actuating means responsive to movement of the sealing means to inoperative position to actuate and subsequently deactuate the air jet.

The sealing means actuating component has a bag sensing element 104 mounted at the gate member 42 and extending on the bag positioning face thereof into the path of bags when the gate member is closed. This bag sensing element 104 is spaced slightly from the face of the gate member to permit displacement thereof by a bag in sealing position, and extends through the gate member to a normally open, electrical switch 106 carried on the opposite face of the gate member, for closing of the switch when the sensing element is displaced by a bag. This switch 106 is electrically connected (FIG. 14) to a normally closed solenoid, air valve 108 (FIGS. 13 and 14) located in an air conduit 110 leading from a supply of compressed air (not shown) to the piston-cylinder mechanisms 80 of the sealing means, to open the valve 108 when the switch 106 is closed by the sensing element 104 and thereby actuate the piston-cylinder mechanisms 80 to manipulate the rocker arms 70 and associated sealing and trimming rod 62 and additional sealing bar 64 to sealing position. The air valve 108 remains open until the sensing element 104 is no longer displaced by a bag, as when the sensing element moves with the gate member 42 to open position out of the path of bags, thereby opening the switch 106, which closes the air valve 108 to deactivate the piston-cylinder mechanisms 80 and allow the return springs 84 to manipulate the rocker arms 70 to raise the sealing means to its initial inoperative position.

The gate actuating means has a switch operating rod 112 (FIG. 10) frictionally positioned for sliding in a mounting bracket 114 on the side of the housing 22. This switch operating rod 112 extends downwardly for operatingly engaging a normally open electrical switch 116 that is electrically connected (FIG. 14) to a normally closed air valve 120 (FIG. 13) in a conduit 122 leading from the compressed air supply to the gate operating cylinder-piston mechanism 48. The operating rod 112 extends upwardly to the adjacent rocker arm 70 between the upper end 72 and pivot 76 of the arm, and carries a pair of arm engaging fingers 118 and 119 that straddle the rocker arm at a spacing greater than the thickness of the arm. As the rocker arm 70 moves to sealing position, it engages the lower finger 119 and moves the switch operating rod 112 downwardly to close the switch 116, thereby opening the air valve 120 to actuate manipulating of the gate member 42 to open position by the cylinder-piston mechanism 48, with the lower finger 119 of the operating rod initially positioned with respect to the rocker arm so that the switch 116 is not closed until the clamping member 90 is in bag clamping position against the sealing bed 66. As the rocker arm 70 returns to inoperative position, the operating rod is frictionally retained initially in switch closing position by a spring loaded detent 124 in the mounting bracket 114 to maintain the gate member in open position as a sealed bag is released by the clamping member 90 and slides past the gate member. When the rocker arm approaches inoperative position, it engages the upper finger 118 of the operating rod 112 to raise the rod and allow the switch 116 to open, which closes the air valve 120, deactivating the cylinder-piston mechanism 48, which allows the return springs 52 to actuate the gate member to closed position.

The air jet actuating means has a switch operating lever 126 fixed to one of the rocker arms 70 between the pivot 76 and the lower end 74 of the arm for movement therewith and extends downwardly therefrom for closing a normally open, electrical switch 128 that is electrically connected to a normally closed solenoid, air valve 130 (FIGS. 13 and 14) located in the air jet conduit 102, which is also connected to the compressed air supply. The switch 128 is mounted on the side of the housing 22 and has a follower roll 134 mounted on the end of a switch finger 136 in the path of the end of the operating lever 126. The switch finger 136 is pivoted intermediately for pivoting without closing the switch when the roll 134 is displaced by the operating lever 126 as the level moves arcuately upwardly (FIG. 8) with movement of the rocker arm 70 to position the sealing means in sealing position. The switch finger has a stop butt 138 at the pivot to prevent pivoting in the other direction so that the finger will be displaced to close the switch 128 as the operating level 126 moves arcuately downwardly (FIG. 9) with movement of the rocker arm 70 to raise the sealing means to inoperative position. This closing of the switch 128 energizes the solenoid valve 130 to open position to actuate the air jet for cleaning of waste material from the sealing bed 66. The switch finger 136 is normally spring biased in an upright position and is positioned in a substantial portion of the operating lever path to provide air jet actuation for a sufficient period to assure adequate waste removal, but does not extend to either end of the path. Thus, the air jet is not actuated until the rocker arm 70 has begun movement of the sealing means from the sealing bed, and is deactuated before the rocker arm has completed movement of the sealing means to its raised, inoperative position.

As seen in FIG. 14, the bag sensing switch 106 and associated sealing means manipulating air valve 108, the gate control switch 116 and associated gate operating air valve 120, and the air jet control switch 128 and associated air jet actuating air valve 130 are connected in parallel in the previously described electrical circuit that energizes the sealing and trimming rod 62 and heating element 100. Thus, a simple and efficient common electrical circuit is provided for energizing all components of the present machine.

With the above described responsive interrelation of the operating components a complete cycle of the machine is performed automatically by simply feeding, either manually or automatically, a bag to be sealed onto the slideway 24. The bag immediately slides to proper sealing position against the normally closed gate member 42 and displaces the bag sensing element 104, which directly actuates manipulation of the sealing means to sealing position. As the clamping member 90 of the sealing means reaches the sealing bed 66 to clamp the bag thereat and the sealing and trimming rod 62 begins to advance to seal and trim the bag end, with the additional sealing bar 64 in bag sealing position, the gate switch operating rod 112 is displaced by the rocker arm 70 to actuate opening of the gate member, which causes the bag sensing element 104 to be moved out of the bag contact, thereby actuating raising of the sealing means to release the bag for sliding past the open gate member to the discharge end of the machine. As the sealing means begins to rise, the lever 126 of the air jet actuating means carried by the rocker arm 70 actuates the air jet. As the sealing means approaches raised position, the rocker arm 70 displaces the gate switch operating rod to actuate closing of the gate member 42 and also carries the lever 126 of the air jet actuating means beyond switch contact to effect deactuation of the air jet. When the sealing means has reached the raised position, the gate member has been closed and the air jet deactuated so that the components are all in their original positions in immediate readiness for repeating the cycle as soon as another bag is fed to the machine.

In some applications it may be preferred to provide a dwell period when the components are in sealing position to increase the effectiveness of the heat sealing, as when relatively thick sheets or a number of sheets are to be sealed. In most instances no such dwell is necessary, but, if desired, it can be provided by incorporating a conventional timer 140 in line with the sealing means manipulating air valve 108, with the timer being settable to provide a range of selectable dwell periods.

The present invention has been described in detail above for purposes of illustration only and is not intended to be limited by this description or otherwise except as defined in the appended claims.

I claim:

1. An automatic sealing machine for heat sealing thermoplastic bags comprising an inclined bag supporting slideway, heat sealing means acting transversely of said slideway and movable between a bag sealing position at said slideway for sealing of bags on said slideway and an inoperative position spaced from said slideway to permit bags to slide along said slideway, automatic means for moving said heat sealing means between said sealing position and said inoperative position, a gate member positioned above said slideway in the path of bags sliding thereon at a spacing from said sealing means to retain bags in position for sealing and being movable out of said path to allow sealed bags to continue down said slideway, gate operating means for moving said gate member in and out of said path, said automatic means having a bag sensing component mounted on said gate member for movement therewith in and out of said path for sensing the presence of a bag at said gate member in position for sealing, said automatic means moving said sealing means to bag sealing position in response to sensing of a bag by said bag sensing component and returning said sealing means to inoperative position when the bag sensing component no longer senses a bag as the gate member and bag sensing component move out of said path.

2. An automatic sealing machine according to claim 1 and characterized further by actuating means acting in response to movement of said heat sealing means to bag sealing position to actuate said gate operating means to move said gate member out of said path.

3. An automatic sealing machine according to claim 2 and characterized further in that said actuating means acts in response to movement of said heat sealing means to said inoperative position to actuate said gate operating means to move said gate member into said path.

4. An automatic sealing machine for heat sealing and trimming ends of thermoplastic bags comprising an inclined bag supporting slideway, a heat sealing and trimming element acting transversely of said slideway and movable between a bag sealing and trimming position at said slideway for sealing and trimming the ends of bags and an inoperative position spaced from said slideway, an additional heat sealing element associated for movement with said heat sealing and trimming element for additionally sealing said bags inwardly of their trimmed ends, automatic means for moving said heat sealing and trimming element and said additional heat sealing element between said sealing position and said inoperative position, gate means associated with said slideway at a spacing from said heat sealing and trimming element to retain bags in position for sealing and being openable to allow sealed bags to continue down said slideway, and gate operating means for opening and closing said gate means.

5. A sealing device for heat sealing and trimming ends of superimposed thermoplastic sheets comprising a sheet supporting sealing bed, a heat sealing and trimming element movable between a sealing and trimming position at said sealing bed and an inoperative position spaced from said bed, said sealing bed being recessed to accommodate movement of said sealing and trimming element through sheets supported on the bed to seal and trim the ends of the sheets, an additional heat sealing element associated for movement with said sealing and trimming element and acting against said bed for additionally sealing sheets therebetween inwardly of their trimmed ends, and means for moving said heat sealing and trimming element and said additional heat sealing element between sealing position and inoperative position.

6. A sealing device according to claim 5 and characterized further in that said heat sealing and trimming element is movable with respect to said additional heat sealing element for movement into said recess as said additional sealing element remains in sealing position against said sheet supporting sealing bed.

7. A sealing device according to claim 5 and characterized further in that the portion of said sheet supporting sealing bed against which said additional heat sealing element acts is formed of resilient material to assure uninterrupted sealing contact of sheets by said additional heat sealing element.

8. A sealing device for heat sealing and trimming ends of superimposed thermoplastic sheets comprising a sheet supporting sealing bed having a sealing element receiving recess, a movable clamping member movable between a position at said sealing bed for clamping sheets therebetween and an inoperative position spaced from said sealing bed and having a sealing element receiving recess aligned with said sealing bed recess, a heat sealing and trimming element positioned in said clamping member recess for movement therewith and being movable therefrom into said sealing bed recess to seal and trim the ends of clamped sheets, an additional heat sealing element movable with said movable clamping member and said sealing and trimming element for action against said sealing bed for additionally sealing clamped sheets inwardly of their trimmed ends, and means for moving said sealing and trimming element and associated movable clamping member and additional sealing element between said inoperative position and said sealing bed and for moving said sealing and trimming element between said recesses while said movable clamping member is at said sealing bed.

9. A sealing device according to claim 8 and characterized further in that said additional sealing element is fixed to said movable clamping member to remain in sealing position while said sealing and trimming element moves between said recesses.

10. An automatic sealing machine for heat sealing and trimming the ends of thermoplastic bags comprising an inclined bag supporting slideway having a transverse sealing bed with a sealing element receiving recess therein, a movable clamping member movable between a position at said sealing bed for clamping bags therebetween and an inoperative position spaced from said slideway and having a sealing element receiving recess aligned with said sealing bed recess, a heat sealing and trimming element positioned in said clamping member recess for movement therewith and being movable therefrom into said sealing bed recess to seal and trim the ends of clamped sheets, an additional heat sealing element movable with said movable clamping member and said sealing and trimming element for action against said sealing bed for additionally sealing clamped bags inwardly of their trimmed ends, automatic means for moving said sealing and trimming element and associated clamping member and additional sealing element between said sealing bed and said inoperative position and for moving said sealing and trimming element between said recesses while said clamping member is at said sealing bed, a gate member positioned above said slideway in the path of bags sliding thereon at a spacing from said sealing bed to retain bags in position for sealing and trimming and being movable out of said path to allow sealed and trimmed bags to continue down said slideway, gate operating means for moving said gate member in and out of said path, said automatic means having a bag sensing component mounted on said gate member for movement therewith in and out of said path for sensing the presence of a bag at said gate member in position for sealing and trimming, said automatic means moving said clamping member, sealing and trimming element and additional sealing element to said sealing bed to seal and trim a bag in response to sensing of a bag by said bag sensing component and returning said clamping member, sealing and trimming element and additional sealing element to inoperative position when the bag sensing component no longer senses a bag as the gate member moves out of said path, and gate actuating means acting in response to movement of said sealing and trimming element to said sealing bed to actuate said gate operating means to open said gate member and acting in response to movement of said sealing and trimming element to inoperative position to actuate said gate operating means to close said gate member.

References Cited by the Examiner
UNITED STATES PATENTS

| | | | |
|---|---|---|---|
| 2,390,550 | 12/1945 | Moore | 53—373 X |
| 3,012,387 | 12/1961 | Jacobs et al. | 53—373 X |
| 3,015,600 | 1/1962 | Cook | 156—356 |

References Cited by the Applicant
UNITED STATES PATENTS

| | | |
|---|---|---|
| 2,627,213 | 2/1953 | Nye. |
| 2,649,672 | 8/1953 | Thompson. |

FRANK E. BAILEY, *Primary Examiner.*

P. H. POHL, *Assistant Examiner.*